Figure 1:
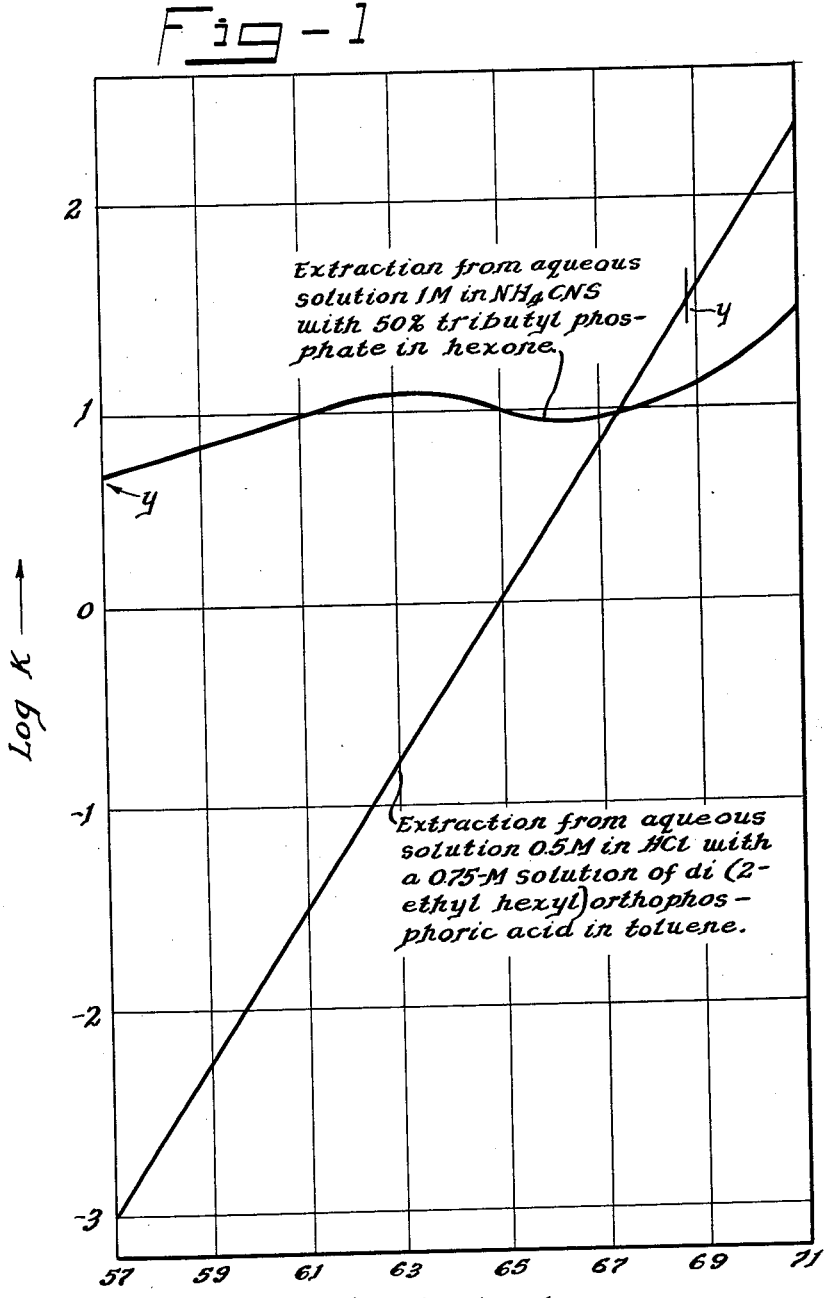

United States Patent Office 3,110,556
Patented Nov. 12, 1963

3,110,556
PROCESS FOR SEPARATING YTTRIUM FROM THE RARE EARTHS BY SOLVENT EXTRACTION
Donald F. Peppard, Oak Park, and George W. Mason, Clarendon Hills, Ill., assignors to the United States of America as represented by the United States Atomic Energy Commission
Filed Apr. 10, 1957, Ser. No. 652,071
17 Claims. (Cl. 23—23)

This invention deals with the recovery of yttrium values contained in aqueous solutions together with lanthanide-type rare earth values. Hereinafter, the term "rare earth values" or "rare earth metals" is always to designate rare earths of the lanthanide group.

Yttrium usually occurs in materials together with rare earths of the lanthanide group, for instance in ores. Since yttrium chemically reacts very similarly to the rare earth metals, separation of it in pure, rare earths-free form is rather difficult. One process has been used heretofore for this purpose which comprises the stepwise extraction of the rare earths and yttrium values from an aqueous acid solution in which the acid concentration is at least 3 N. This process is described in our copending application Serial No. 345,258, filed on March 27, 1953, now Patent No. 2,955,913. In the process there described, the extractability of the rare earths increases with increasing atomic numer, and that process is applicable to the recovery of yttrium, since yttrium there behaves as if it had an atomic number of between 66 and 67. However, the extractability values of the various rare earth elements in that process are rather close to each other so that a great many extraction and back-extraction cycles are necessary to accomplish a satisfactory separation.

It is an object of this invention to provide a process for the extraction of yttrium values from rare earth values which requires a greatly reduced number of steps.

It has been found that by contacting an aqueous solution containing rare earth metal values and yttrium values and a mineral acid in a concentration of below 2 N with a dialkyl phosphoric acid, the extractability increases with increasing atomic number and yttrium behaves as if it had an atomic number of between 67 and 68. It was also found that by contacting an aqueous thiocyanate solution of rare earth and yttrium values with a trialkyl phosphate or trialkyl phosphonate or dialkyl phosphoric acid, extraction also increases with increasing atomic number and yttrium behaves as if it had an atomic number of between 57 and 62. Furthermore, it was found that the extraction of rare earth values and yttrium values with dialkyl phosphoric acid can have a different mechanism depending upon whether the extraction is carried out from an aqueous solution having a high or a low acid content; in the case of concentrated acid, the entire salts are extracted, while in the case of a dilute acid the cations only are extracted. Finally, it was also discovered by the inventors that by extraction with a trialkyl phosphate the salts rather than the cations are extracted. These facts are the same whether the mineral acid in the aqueous solution is sulfuric acid, hydrochloric acid or nitric acid.

The possibility of extracting the cations only by using a low acid content and a dialkyl phosphate has the advantage that the cation present in the original aqueous solution in the form of one salt can be recovered in the form of another salt by using an acid for back-extraction from the dialkyl phosphoric acid solution which has the anion desired in the new salt.

Figure 2:
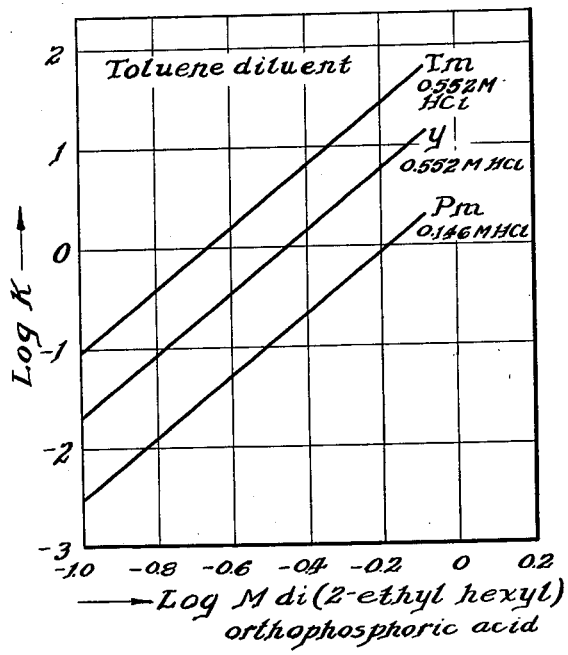
Figure 3:
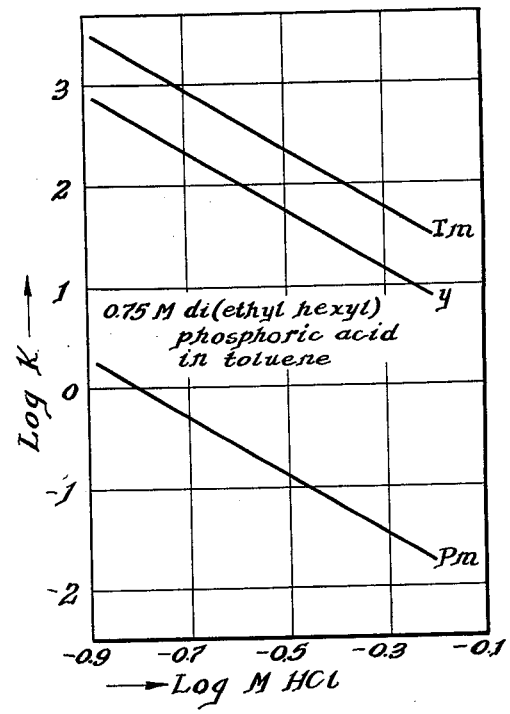

In the accompanying drawings:
FIGURE 1 shows the function of extractability of the various rare earths and their atomic number (*a*) with a toluene solution of a dialkyl orthophosphoric acid from an aqueous hydrochloric acid solution and (*b*) with a trialkyl phosphate solution in hexone from an aqueous thiocyanate-containing solution;

FIGURE 2 shows the function of extractability of thulium, promethium, yttrium and the concentration of a dialkyl phosphoric acid ester; and FIGURE 3 shows the function of extractability of the same elements as those of FIGURE 2 and acid concentration.

In all these processes of rare earths and yttrium extraction, the function between the atomic number of the various elements and the logarithm of the distribution coefficient "K," which is the ratio of concentration in the organic phase: concentration in the aqueous phase, represents a straight line when plotted. In FIG. 1 of the accompanying drawings two of these curves are shown, one for the extraction from a low-acid solution with dialkyl phosphoric acid and one for the extraction from an aqueous thiocyanate solution with trialkyl phosphate. Yttrium can be incorporated on these two curves if it is given an artificial atomic number of 67.5 in the first instance, and of roughly 58.5 in the second instance.

The above-described findings were utilized in devising the process of this invention. According to the process of this invention two extraction cycles are carried out, one using dialkyl phosphoric acid and an aqueous mineral acid feed solution of low acidity, and the other cycle using an aqueous thiocyanate solution and either a dialkyl phosphoric acid, or a trialkyl phosphate or phosphonate or a dialkyl aryl phosphonate as the solvent. The conditions are chosen in these two extractions so that yttrium first reports in one phase, organic or aqueous, and in the second cycle in the opposite phase. By this a separation of yttrium from the lighter rare earths and from the heavier rare earths is accomplished successively, and in two extraction cycles a considerably higher degree of separation or decontamination is accomplished than is achieved by two extraction steps of the process forming the subject matter of the above-mentioned copending application.

More in detail, the process of this invention comprises providing an oqueous solution containing rare earth valves and yttrium values with a content of free mineral acid not higher than 2 N, contacting said solution with a dialkyl phosphoric acid whereby heavier rare earth and yttrium values are extracted into an organic phase and the lighter rare earth values remain in the aqueous solution, separating said organic phase from said aqueous solution, contacting said organic phase with a mineral acid of a concentration between 5 and 6 N whereby an aqueous strip solution containing said yttrium values and heavier rare earth values is obtained, adding a water-soluble thiocyanate to said aqueous strip solution, contacting said thiocyanate strip solution with a solvent selected from the group consisting of trialkyl phosphate, dialkyl phosphoric acid, alkyl phosphonate and dialkyl aryl phosphonate whereby said heavier rare earth values are taken up by an extract phase while said yttrium values remain in said aqueous strip solution, and separating said extract phase from said strip solution.

Instead of carrying out the extraction with dialkyl phosphoric acid first, the order can also be reversed and the first extraction cycle can be carried out from a thiocyanate-containing aqueous solution with trialkyl phosphate or any of the other solvents listed above whereby the yttrium will remain in the aqueous phase with some lighter rare earth values; this aqueous phase is then subjected to another extraction process with dialkyl phosphoric acid, after adjustment of the acidity, whereby the yttrium is extracted away from the lighter rare earth values. Both processes yield equally good results.

The solvents used for both extraction steps have to be substantially water-immiscible. Dialkyl phosphoric acids which have been particularly well suitable for both phases of the process of this invention are hydrogen dibutyl orthophosphoric acid and hydrogen dioctyl orthophosphoric acid, for instance, the di(2-ethyl hexyl) orthophosphoric acid; the latter is preferred because it has a lower solubility in water and a lesser tendency to hydrolize than the dibutyl phosphoric acid. A great many trialkyl orthophosphates, dialkyl phosponates, dialkyl alkyl or dialkyl aryl phosphonates are useable for the extraction from the thiocyanate solution. The preferred phosphates were tributyl phosphate and dioctyl phenyl phosphonate, the latter showing a sharper separation yet than the tributyl phosphate; hexone was the preferred diluent for the trialkyl phosphates.

Dioctyl phosphoric acid is commercially available in a mixture with mono octyl orthophosphoric acid and also with small quantities of pyrophosphoric acid esters. The monoesters, which may be present in quantities up to 40 percent and more, have to be removed from the mixture because the impair separation; the same is true for the pyroesters.

For this reason a purification process was used comprising stirring with a 6-M hydrochloric acid at about 60° C. for sixteen hours whereby the pyroester was destroyed by hydrolysis. Thereafter, the solvent was scrubbed with water to remove the hydrochloric acid. An extraction process with a diethyl ether-ethylene glycol mixture was then applied whereby the dioctyl phosphoric acid was extracted into an ether phase while the monoester was held in the aqueous phase by the ethylene glycol. After separation of the two phases the ether extract was purified with activated charcoal, and the ether phase was then subjected to evaporation at room temperature and reduced pressure whereby a residue of hydrogen dioctyl phosphoric acid was obtained. The hydrogen dioctyl phosphoric acid was then subjected to two more ether extraction cycles carried out as just described whereby the pure diester was obtained.

The dialkyl and trialkyl esters have a rather high viscosity and usually a specific gravity close to that of water. It is therefore advantageous to dilute these phosphates with an organic solvent of low density and low viscosity. Toluene, n-heptane, benzene and hexone are among the many organic solvents suitable for this purpose. Hexone at the low acidity used for the two extraction steps with the phosphoric acid esters, for practical purpose, does not extract any metal values, and thus merely functions as an inert diluent.

The quantity and concentration of the dialkyl phosphoric acid in the mixture depends on the yttrium content of the feed. It was found that there exists a direct third-power dependency between the concentration of the diesters in the equilibrated organic mixture and the distribution coefficient "K" and an inverse third-power dependency between the acid concentration in the equilibrated aqueous phase and "K." This relationship is true for all the lanthanides and the yttrium, and it is shown in FIGURES 2 and 3 for some of the rare earths.

The concentration of the alkyl phosphoric acid esters in the diluent can be varied widely, a concentration between 25 and 50 percent being the preferred range.

Prior to extraction it is advantageous to pre-equilibrate the solvent with an acid of approximately the same concentration as is present in the aqueous solution to be contacted with the solvent, so that the acidity remains constant in the aqueous solution and is not reduced by acid extraction into the organic solvent.

For the dialkyl phosphoric acid extraction, as has been mentioned before, the acidity should not be higher than 2 N in order to accomplish extraction of the cation only. An acidity of between 0.3 and 0.5 M was found to be the preferred range.

The metal values extracted into the solvents, alkyl phosphoric or dialkyl phosphoric acids or alkyl phosphonates, are back-extracted or stripped by contact with mineral acid. Sulfuric, nitric or hydrochloric acid can be used for this purpose; a concentration of between 5 and 6 N gave the best results. The aqueous strip obtained thereby is then advantageously scrubbed with benzene or other solvent to remove traces of alkyl phosphate taken up by the stripping acid.

For extraction from a thiocyanate solution, the aqueous feed is first neutralized. This can be done by the addition of an alkali hydroxide, or else the acid can be removed by volatilization; another possibility is the precipitation of the cations contained in the aqueous solution as the oxides and redissolving the oxides in the stoichiometric amount of acid. Thiocyanate anions are then added in the form of a water-soluble salt preferably in a quantity to obtain a concentration of about 1 M. This concentration is not critical. Extraction from the thiocyanate solution is similar to that for the dialkyl phosphate, all known extraction methods being suitable.

The process of this invention can be carried out by using batch or continuous methods, a countercurrent flow being preferably used for the latter. Operation of the extraction process in an extraction column is particularly advantageous.

The final aqueous product solutions containing the yttrium can then furthermore be processed for the recovery of the yttrium values. Precipitation with oxalic acid or with ammonia have been found satisfactory, or else extraction with a pure undiluted tributyl phosphate has also given good results.

The yttrium compounds recovered by the process of this invention can then be converted to the yttrium metal by any method known to those skilled in the art. Conversion to the yttrium metal is not part of the invention. One process comprises the conversion of the yttrium compound to the trifluoride and the reduction of the trifluoride by calcium metal in a refractory-lined sealed crucible, as is described in the assignee's copending application Serial No. 649,265, filed by O. N. Carlson, Frederick Schmidt and F. H. Spedding on March 28, 1957, now Patent No. 2,950,962.

There are a great many uses for yttrium metal. For instance, it can be used as a getter in the manufacture of vacuum tubes on account of its great affinity to hydrogen. In manufacturing vacuum tubes with yttrium as a getter, the oxygen is first swept out of the tube with hydrogen gas, the yttrium metal is placed in the tube, and the tube is then evacuated. The yttrium reacts with any remaining hydrogen and forms yttrium hydride thereby removing the hydrogen from the atmosphere.

Another application of yttrium metal is for the preparation of yttrium hydride which is used as a neutron moderator, instead of paraffin, to slow down the fast neutrons of a neutron source, yttrium hydride having a higher hydrogen concentration than paraffin. A nuetron source of the type intended for the use of yttrium hydride as a substitute for paraffin as a moderator is disclosed, for instance, in "Miscellaneous Physical and Chemical Techniques of the Los Alamos Project," by Graves and Froman, National Nuclear Energy Series V-3, p. 107. For this use it is desirable to have the yttrium in a high degree of purity and especially free from contaminants that have a high neutron-capture cross section.

In the following, some examples are given which illustrate the process of this invention. The process is not to be limited by the details given in these examples.

EXAMPLE I

The content of various rare earth groups in a rare earth mixture was determined by spectroscopical analyses, and from the data obtained the amount of hydrochloric acid necessary to dissolve the rare earths without having too great an excess of free acid and also the amount of extractant necessary to predetermine the partitioning point in the extraction were calculated. (The partitioning point is the point in a series of rare earths arranged according to the atomic numbers below which less than 50 percent report in the organic phase and above which more than 50 percent report in the organic phase.) The amount of solvent to be used was derived from the third-power dependency curves for acid and solvent and the content of the feed solution as to the various rare earths and yttrium.

The rare earth mixture used for the example was found to contain, per 2000 mg. of yttrium, 400 mg. of dysprosium, 150 mg. of erbium, 250 mg. of gadolinium, 50 mg. of holmium, 50 mg. of terbium, 20 mg. of thulium, 3 mg. of lutetium, 10 mg. of samarium and 100 mg. of ytterbium. From these data the total content of rare earths plus yttrium expressed in moles of metal per 100 g. of the oxide mixture was calculated to be 0.724 mole for which about 2.2 moles of hydrochloric acid were required.

The feed was thus prepared by dissolving 83.3 g. of the oxide mixture in 1.85 moles of concentrated hydrochloric acid, and the solution was then diluted to 1 liter in order to obtain a molarity for the rare earths, including yttrium, of 0.5 M. The feed solution obtained thereby was 0.3 M in free hydrochloric acid. The solvent used was 50 parts by volume of dioctyl phosphoric acid diluted with toluene to 100 parts by volume; this mixture was 1.5 M in dioctyl phosphoric acid.

A 7-stage countercurrent semi-continuous extraction process was used, employing as extractors seven separatory funnels connected in series. The fresh feed was introduced in the fourth funnel, the solvent mixture in the seventh funnel, and a scrub solution, namely 1 M hydrochloric acid, in the first funnel. The quantities used for feed, solvent and scrub, were 20 ml., 40 ml. and 20 ml., respectively. The aqueous solutions or phases from each funnel were transferred to the next-following extractor, while the organic solvent or phases were transferred in each case to the preceding funnel. In this countercurrent operation, funnels 1 through 3 functioned as the scrubbing section and funnels 4 through 7 as the extraction section. The aqueous solution leaving funnel No. 7 and the organic solution leaving funnel No. 1 were the "aqueous product solution" and the "organic product solution," respectively. Each contact was maintained for three minutes under stirring, and two minutes were allowed for settling.

Eighteen cycles (using 18 feed additions) were carried out, the first three cycles being required to charge all funnels. Fifteen organic and 15 aqueous product solutions were obtained.

The first 14 aqueous product solutions were combined as "AP-Comb.," and the 15th aqueous product solution was termed "AP-15." The first 14 organic product solutions were combined as "OP-Comb.," while the 15th organic product solution was kept separate as "OP-15."

The 15th aqueous product solution, "AP-15," was washed with an equal volume of toluene to remove traces of the dioctyl phosphate, and 10 ml. thereof were then diluted with water to 100 ml. This solution was designated "AD-15." Ten ml. of the 15th organic product solution, "OP-15," were diluted with 10 ml. of toluene, in order to expedite re-extraction, and back-extracted or stripped with four successive 23-ml. portions of 5 M hydrochloric acid. The aqueous strip solutions obtained were cycled each through 40 ml. of toluene to remove traces of the dioctyl phosphate. The strips were then combined and diluted to 100 ml. with water; the resulting diluted solution was "SD-15." Thus 10 ml. of "SD-15" corresponded to 1 ml. of "OP-15." Furthermore, a sample of the original feed was diluted with water 1:20 and then termed "FD." Solutions "SD-15," "AD-15" and "FD" were analyzed by spectroscopy. The relative results, in micrograms per milliliter, are compiled in Table I.

*Table 1*

| | Y | La | Nd | Sm | Eu | Gd | Tb | Dy | Ho | Er | Tm | Yb | Lu |
|---|---|---|---|---|---|---|---|---|---|---|---|---|---|
| FD | 1,500 | 5 | 7 | 12 | 1.5 | 300 | 90 | 500 | 100 | 240 | 25 | 80 | 4 |
| AD-15 | 120 | 5 | 7 | 12 | 2 | 300 | 80 | 450 | 30 | 4 | <2 | <0.2 | <0.1 |
| SD-15 | 1,000 | <1 | <5 | <5 | <1 | <5 | <5 | 35 | 18 | 100 | 10 | 50 | 2 |

The approximate yield of yttrium based on the yttrium content of "AD-15" was calculated to be 92 percent, and the approximate decontamination factors of yttrium in regard to other rare earths $$\left(\frac{\text{Y in solvent}}{\text{Y in feed}} : \frac{\text{RE in solvent}}{\text{RE in feed}}\right)$$

were 3.7 for holmium, 9.5 for dysprosium, >12 for terbium and >40 for gadolinium. The partitioning or cutting point was between holmium and erbium as had been calculated before carrying out the experiment.

The combined 14 organic product phases "OP-Comb." were then processed to separate the yttrium from co-extracted rare earths which especially were those having atomic numbers of above 66. Tributyl phosphate extraction from a thiocyanate solution was intended for this phase of the process.

The 560 ml. of "OP-Comb." were first diluted with an equal amount of toluene. This diluted solution was then back-extracted three times, each with a 560-ml. portion of 6 M hydrochloric acid. The three strip solutions thus obtained were passed through 560 ml. of toluene to remove back-extracted traces of dioctyl phosphoric acid, and they were then combined and evaporated to a volume of 40 ml. To this concentrated solution there was then added 100 ml. of a 4 M ammonium thiocyanate solution, and the solution thus obtained was then diluted with water to a volume of 200 ml. The solution was then scrubbed with two 50-ml. portions of methyl isobutyl ketone (hexone) to remove thiocyanic acid, because the latter ties up the solvent and thereby impairs extraction. This solution is the thiocyanate feed for the tributyl phosphate extraction, in short "TC-feed."

The same equipment and set-up was used for this extraction phase as was used for the extraction with dioctyl phosphoric acid. The volume ratio of feed:solvent:scrub was 10 ml.:30 ml.:40 ml. The solvent was 50 percent tributyl phosphate in toluene, the scrub a 1-M solution of ammonium thiocyanate. Stirring was carried out for two minutes, and one minute was allowed for settling. There were 17 organic extract phases and 17 aqueous phases, and the 17th phase of each category was kept separate as "E Ph 17" and "A Ph 17."

To 10 ml. of the seventeenth aqueous phase "A Ph 17" there was added concentrated ammonia whereby a precipitate was formed. The precipitate was filtered off, washed with water and dissolved in 2 ml. of 2 M hydrochloric acid. The solution was diluted with water to 10 ml. of solution "17A."

The solution "E Ph 17" was contacted twice for back-extraction, each time with 10 ml. of 3 M hydrochloric acid. The strips were combined, and concentrated ammonia was added for precipitation. The precipitate was washed with water and then dissolved in hydrochloric acid. The solution was diluted to 50 ml. with water, which corresponds to a five-fold dilution of the organic phase "E Ph 17." This diluted solution is solution "17S."

Five ml. of the "TC-feed" were also precipitated with concentrated ammonia. The precipitate was washed with water and dissolved in hydrochloric acid. The hydrochloric acid solution was diluted with water to 50 ml. which is a 1:10 dilution; this diluted solution is "17F." The three solutions "17A," "17S" and "17F" were analyzed spectroscopically. No rare earth having an atomic number below 66 was detected in any of these three solutions. Table II gives the analytical results in micrograms/milliliter.

*Table II*

|     | Y     | Dy   | Ho    | Er  | Tu    | Yb   | Lu    |
|-----|-------|------|-------|-----|-------|------|-------|
| 17F | 5,200 | 280  | 140   | 480 | 100   | 480  | 16    |
| 17S | 4,500 | 300  | 150   | 600 | 90    | 480  | 15    |
| 17A | 200   | 0.5  | <0.5  | 1   | <0.4  | 0.05 | <0.1  |

The yield of purified yttrium was about four percent. Repetition of the extraction cycles will recover the other yttrium fraction in purified form and thus increase the yield.

The next example proves that a dialkyl phosphonate is also satisfactory as a solvent in the yttrium-rare earths separation from an aqueous thiocyanate solution.

EXAMPLE II

A solution was prepared by dissolving a mixture of yttrium and rare earths oxides in an excess of aqueous hydrochloric acid and diluting the solution obtained with water to form a solution 0.5 M in hydrochloric acid and containing 267 mg./ml. of total rare earths (III) oxides, including yttrium oxide. A 124 ml.-fraction of this solution was added to 160 ml. of a 4-M aqueous ammonium thiocyanate solution, and the mixture obtained was then diluted with sufficient water to obtain a total volume of 400 ml. The solution was then contacted with two 100-ml. portions of methyl isobutyl ketone to remove the small quantity of thiocyanic acid. The final aqueous solution, 400 ml., the feed, contained approximately 83 mg./ml. of rare earths plus yttrium oxides and was 1.44 M in total $CNS^-$ anions.

The solvent used consisted of one volume of di(2-ethyl hexyl) (2-ethyl hexyl) phosphonate diluted to two volumes with methyl isobutyl ketone. The scrub was an aqueous 0.5 M solution of ammonium thiocyanate. In a seven-stage countercurrent run the scrub was introduced into stage No. 1, the feed into stage No. 4 and the solvent into stage No. 7. Each type of solution, the scrub, feed and the solvent was used in a volume of 20 ml.

Mixing periods of two minutes and settling periods of 1 to 2 minutes were used. The operation was continued until 17 product phases had been removed from each of the terminal contactors, i.e., 20 portions of feed were used.

The 17th aqueous product phase was identified as DFP28A17 and the 17th organic product phase as DFP28P17. The compositions of the feed, of DFP28P17 and of DFP28A17, relative to 1,000 parts of yttrium by mass, are given in Table III. The quantity of yttrium reporting in DFP28A17 was 80 percent of that introduced in a single portion of feed. Therefore the yttrium yield was 80 percent.

In Table III the rare earths and yttrium contents of the feed, organic product and aqueous product solutions, per 1000 parts of yttrium, are listed.

*Table III*

| Content relative to Y | Y | La | Ce | Nd | Sm | Eu | Gd | Tb | Dy | Ho | Er | Tm | Yb | Lu |
|---|---|---|---|---|---|---|---|---|---|---|---|---|---|---|
| Phase: | | | | | | | | | | | | | | |
| Feed | 1,000 | 3 | 5 | 5 | 8 | 1 | 200 | 60 | 330 | 70 | 160 | 16 | 50 | 2 |
| DFP28P17 | 1,000 | | | | 1 | 0.1 | 360 | 80 | 460 | 100 | 240 | 40 | 180 | 2 |
| DFP28A17 | 1,000 | 3 | 5 | 9 | 6 | 0.6 | 60 | 12 | 5 | 9 | 9 | <1 | 0.06 | <0.06 |

From Table III, certain decontamination factors, for the aqueous phase, are deducible: for Y/Gd the decontamination factor was 3, for Y/Tb 5, for Y/Dy 6, for Y/Ho 8, for YEu 19, for Y/Tm>16, for Y/Yb about 800, and for Y/Lu>30.

It will be understood that this invention is not to be limited to the details given herein but that it may be modified within the scope of the appended claims.

What is claimed is:

1. A process of recovering yttrium values from an aqueous solution containing said yttrium values together with a mixture of heavier and lighter rare earth metal values comprising providing a mineral acid content of below 2 N in said aqueous solution; contacting said aqueous solution with a dialkyl phosphoric acid as an extractant whereby said heavier rare earth metal values and said yttrium values are extracted into an organic extract phase, while said lighter rare earth metal values remain in the aqueous solution; separating said organic extract phase from said aqueous solution; contacting said organic extract phase with an aqueous mineral acid having a concentration of between 5 and 6 N whereby said yttrium values and said heavier rare earth metal values are taken up by said aqueous acid solution and an aqueous strip solution is formed; incorporating a water-soluble thiocyanate into said strip solution; adding a solvent to said strip solution, said solvent being selected from the group consisting of trialkyl phosphates, dialkyl phosphoric acids, alkyl phosphonates, and dialkyl aryl phosphonates whereby said heavier rare earth metal values are extracted into a solvent phase while said yttrium values remain in the aqueous strip solution; and separating said solvent phase from said strip solution.

2. The process of claim 1 wherein the mineral acid content of below 2 N is between 0.3 and 0.5 N.

3. The process of claim 1 wherein said extractant is hydrogen dibutyl orthophosphoric acid.

4. The process of claim 1 wherein the extractant is hydrogen dioctyl orthophosphoric acid.

5. The process of claim 4 wherein said hydrogen dioctyl orthophosphoric acid is hydrogen di(2-ethyl hexyl) orthophosphoric acid.

6. The process of claim 1 wherein the solvent is tributyl phosphate.

7. The process of claim 1 wherein the solvent is dioctyl phenyl phosphonate.

8. The process of claim 1 wherein the solvent is dioctyl octyl phosphonate.

9. The process of claim 1 wherein the extractant and the solvent are dissolved in an organic diluent.

10. The process of claim 9 wherein the extractant-diluent and the solvent-diluent solutions have a content of from 25 to 50 percent by volume of the extractant and the solvent.

11. The process of claim 10 wherein the diluent is toluene.

12. The process of claim 10 wherein the diluent is hexone.

13. The process of claim 10 wherein the diluent is n-heptane.

14. The process of claim 10 wherein the diluent is benzene.

15. A process of recovering yttrium values from an aqueous solution containing said yttrium values together with a mixture of heavier and lighter rare earth metal values comprising adding a water-soluble thiocyanate to said solution; adding a solvent to said solution, said solvent being selected from the group consisting of trialkyl phosphates, dialkyl phosphoric acids, alkyl phosphonates and dialkyl aryl phosphonates whereby said heavier rare earth metal values are extracted into a solvent phase while said yttrium values and said lighter rare earth metal values remain in said aqueous solution; separating said solvent phase from said aqueous solution; providing a mineral acid content of below 2 N in said aqueous solution; contacting said aqueous solution with a dialkyl phosphoric acid whereby said yttrium values are extracted into an organic extract phase while said lighter rare earth metal values remain in the aqueous solution; separating said organic extract phase from said aqueous solution; and contacting said organic extract phase with an aqueous mineral acid solution having a concentration of between 5 and 6 N whereby said yttrium values are back-extracted into said aqueous mineral acid solution.

16. A process of recovering yttrium values from an aqueous solution containing said yttrium values together with a mixture of heavier and lighter rare earth metal values comprising adding a water-soluble thiocyanate to said solution; adding a solvent to said solution, said solvent being selected from the group consisting of trialkyl phosphates, dialkyl phosphoric acids, alkyl phosphonates and dialkyl aryl phosphonates whereby said heavier rare earth metal values are extracted into a solvent phase while said yttrium values and said lighter rare earth metal values remain in said aqueous solution; and separating said solvent phase from said aqueous solution.

17. A process of converting a lanthanide rare earth metal salt of a first mineral acid to a lanthanide rare earth metal salt of a second mineral acid, comprising providing an aqueous solution containing the rare earth metal salt of said first mineral acid and an excess of said first mineral acid, said excess of said free first mineral mineral acid being limited to a maximum concentration of 2 N; contacting said aqueous solution with dialkyl phosphoric acid whereby the rare earth metal cation is extracted into a dialkyl phosphoric acid phase; separating said dialkyl phosphoric acid phase from the aqueous solution; and contacting said dialkyl phosphoric acid phase with an aqueous solution of said second mineral acid whereby the rare earth cations are back-extracted into said second mineral acid solution and a rare earth salt of said second mineral acid is obtained.

References Cited in the file of this patent

UNITED STATES PATENTS 2,227,833   Hixson  ------------------ Jan. 7, 1941
2,564,241   Warf  ------------------- Aug. 14, 1951

OTHER REFERENCES

Warf: AECD–2524, August 7, 1947, declassified March 11, 1949, 10 pages.

Peppard et al.: "J. of Phys. Chemistry," vol. 57, pages 294–301, March 1953.